United States Patent [19]
Martinez de Castro Lopez

[11] 3,773,123
[45] Nov. 20, 1973

[54] SCALE BLOCKING MEANS

[76] Inventor: Manuel Martinez de Castro Lopez, Ave. Rio Churubusco No. 434, Coyocan, Mexico

[22] Filed: Jan. 7, 1972

[21] Appl. No.: 216,014

[52] U.S. Cl. .............................. 177/155, 177/136
[51] Int. Cl. ...................... G01g 23/02, G01g 19/08
[58] Field of Search ......................................
177/154–159, 136, 138

[56] References Cited
UNITED STATES PATENTS
3,199,619   8/1965   Hathaway .......................... 177/136

Primary Examiner—George H. Miller, Jr.
Attorney—Bruce & McCoy

[57] ABSTRACT

A sytem for blocking the weighing mechanism of a scale, including a plurality of wedges which are movable into and out of contact with the weighing mechanism to partially or totally block the movement thereof.

8 Claims, 7 Drawing Figures

SCALE BLOCKING MEANS

BACKGROUND OF THE INVENTION

1. Field of the Invention

This invention relates generally to scales and more particularly to means for blocking, either partially or totally, the weighing mechanism of a high capacity weighing scale.

2. Description of the Prior Art

High capacity scales used to weigh locomotives, railway cars, or other large vehicles are subject to use with items having large variations in weight and must be protected from accidental overloading which might cause excessive wearing of the knife-edges and bearings or their complete destruction.

In known systems for weighing locomotives, railway cars, and the like, the scale is provided with a platform having rails fixed thereto. When a locomotive or railway car is brought over the rails mounted on the platform, the platform together with the rails is flexed or forced downwardly to operate the scale mechanism and thereby indicate the weight of the item. To insure that overloaded cars are not passed over the scales, the scale is placed under a separate spur track connected to the main line by switches and the necessary signalling and railway warning signs to give adequate warning thereof. In some instances, due to inadvertance, malfunction of the system, or negligence on the part of an employee, switches have been improperly activated or remained in a position whereby overloaded cars have passed over and damaged or destroyed the scales.

To overcome the above-described disadvantages, the present invention provides for the utilization of only one set of rails, thereby eliminating the need for the spur railway with its signalling devices and switches. The invention allows the normal passage of locomotives, railway cars, trucks, hand cars, or the like, over the platform and/or rails of the scale without damage to the weighing mechanism, by providing means for disconnecting the weighing mechanism of the scale from the platform and rails.

In the preferred embodiment of the invention, the operation of the weighing mechanism of the scale is operated in a partially blocked condition. This permits weighting of smaller loads and prevents overlarge displacements of the scale weighing mechanism which might cause misalignment of the operating portions and consequent variations of the true zero balance of the operative scale. Therefore, the invention provides for the regulation and adjustment of the amount of blocking of the weighing mechanism according to each particular use of the scale.

SUMMARY OF THE INVENTION

The present invention comprises a system for blocking the weighing mechanism of a scale which includes a set of primary wedges movable into and out of contact with the weighing mechanism to thereby block or unblock the operation of the scale.

OBJECTS OF THE INVENTION

It is therefore an important object of the present invention to provide means to block the operation of the weighing mechanism of a scale to prevent overloading thereof.

It is another object of the instant invention to provide an improved scale, having a simple and easily maneuvered system which coacts with the scale weighing mechanism to render the scale inoperative.

It is a further object of this invention to provide a scale which allows a train or the like either to pass safely thereover or to be weighed thereby upon the mere switching of a weighing mechanism blocking means.

It is still another object of the present invention to provide a high capacity scale with a series of mechanism blocking systems whereby the scale can weight different weight loads and be fully protected against overloading in any of its operative or inoperative positions.

It is still a further object of the invention to provide a scale blocking system with indicating lights which show the blocked or operative position of the scale.

And yet another object of this invention is the provision of a mechanism blocking system having an adjustable timer which will automatically move the blocking system back into contact with the weighing mechanism to thereby render the scales inoperative after an adjustable and predetermined period of time.

DESCRIPTION OF THE PREFERRED EMBODIMENT

The present invention is applicable for use in any type of scale having a platform with a weighing mechanism connected thereto. In particular, high capacity weighing scales such as warehouse scales, truck scales, or railroad scales are easily adapted for use with the instant invention.

Figure 1:
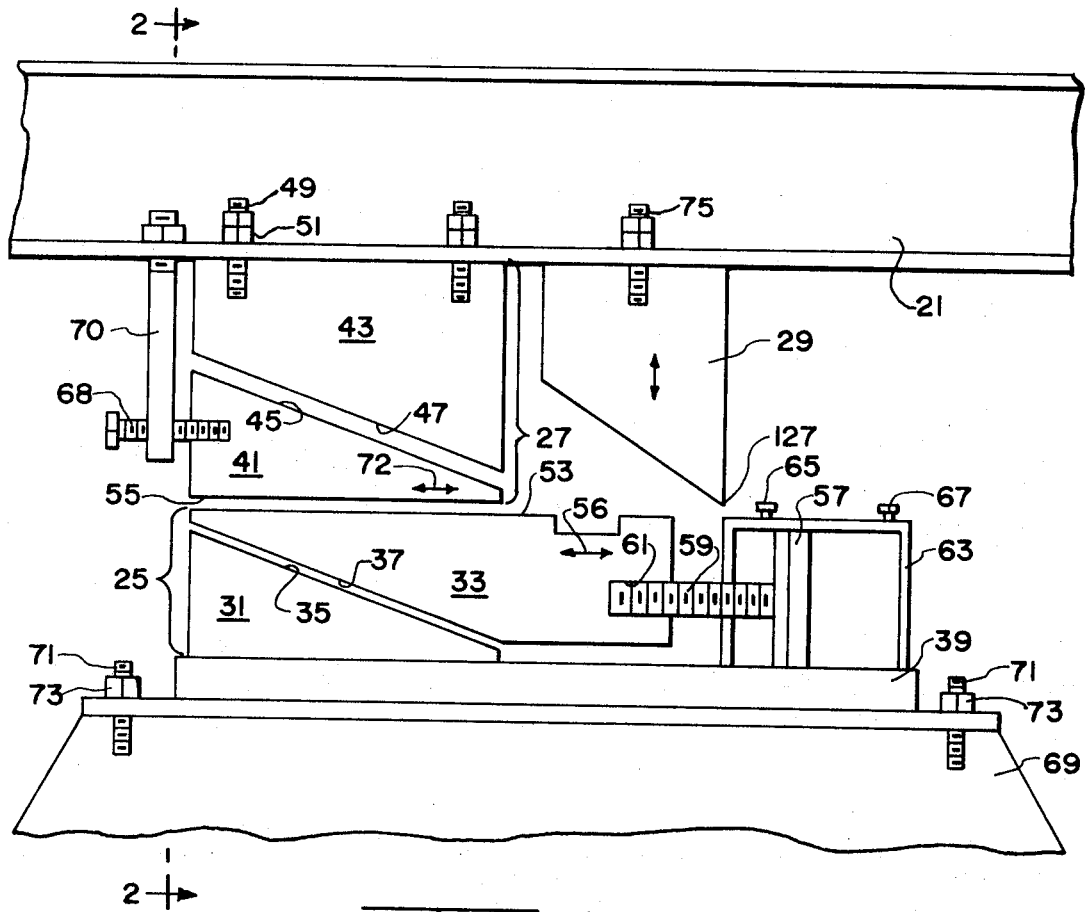
FIG. 1 is a side elevation, in partial cross-section, of a preferred embodiment of the blocking system of the present invention disposed in a high capacity weighing scale.
Figure 4:
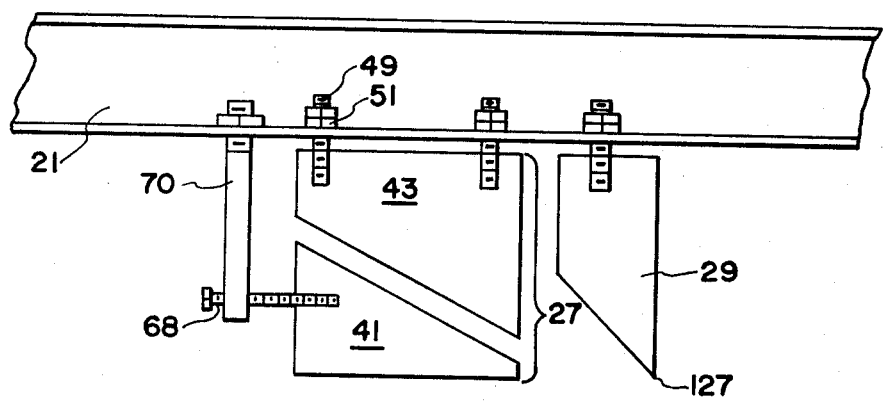
FIG. 4 is a side view of that portion of the blocking system of FIG. 1, which is attached under a support girder or a rail.
Figure 2:
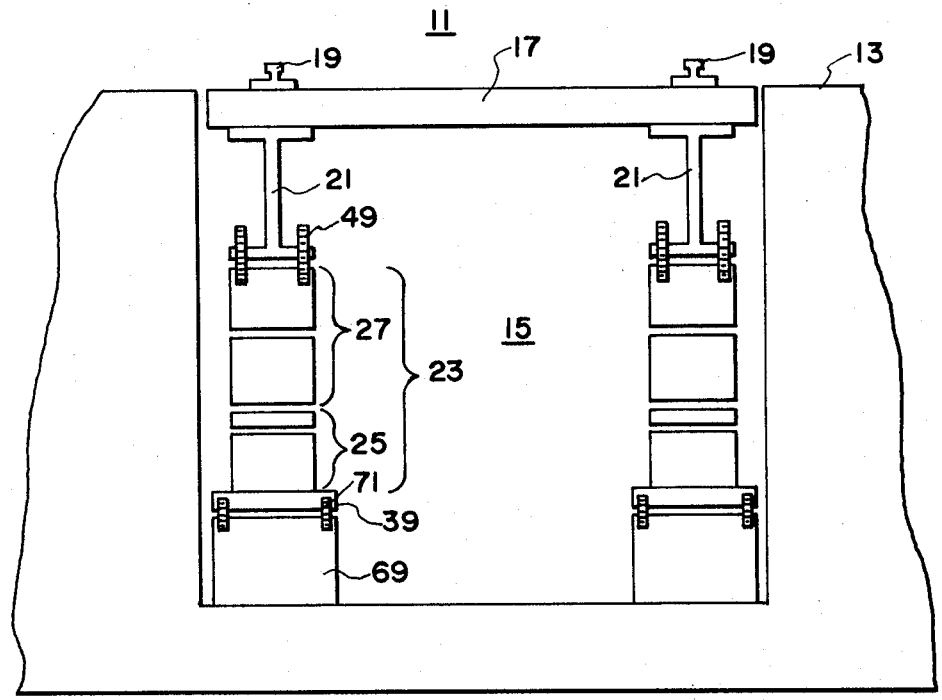
FIG. 2 is an end elevation cross-sectional view taken along lines 2—2 of FIG. 1.
Figure 3:
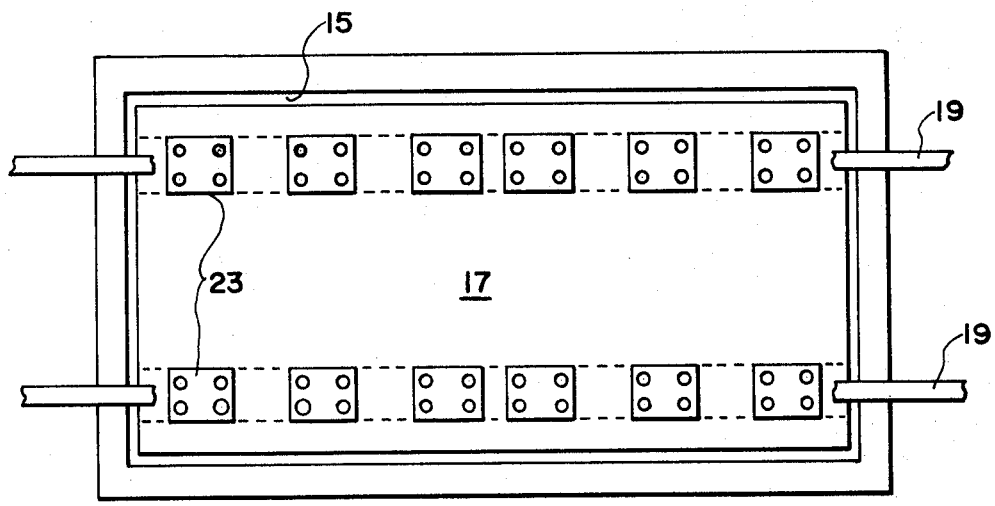
FIG. 3 is a top plan partial cross-sectional view of the preferred embodiment of the blocking system of the present invention.

FIG. 2 shows the end view of a typical high capacity weighing scale. The scale 11 is generally disposed below ground level 13 and is mounted in a concrete pit 15 within which the scale operating mechanism (not shown) is disposed. A scale weighing platform 17 is generally disposed within the concrete pit at ground level and a set of rails 19 are fixed thereto. The platform may be made from any suitable material, such as wooden planks, sheet metal, or reinforced concrete. In the preferred embodiment shown, the platform is supported by at least two longitudinally extending steel I-beams 21 mounted over the scale operating mechanism. The operating mechanism has not been illustrated as such are believed to be well-known to those skilled in the art.

The preferred arrangement of a blocking system 23 in accordance with the present invention is shown in FIGS. 1-4 and comprises a series of wedges described more fully hereinafter. Depending on the length of the rails 19 and the longitudinal platform support I-beams 21, any number of blocking systems 23 may be used. As shown in FIG. 2, a plurality of systems are provided under each rail to insure the adequate blocking of the scale.

Each blocking system 23 comprises a plurality of wedges including: a first or primary set of wedges 25; a secondary set of wedges 27; and a single, emergency or overload wedge 29. The primary set of wedges includes two wedges 31, 33 having angularly juxtaposed surfaces 35, 37. The lower wedge 31 is fixed to and supported by a base 39, as will be explained more clearly hereinafter.

The secondary set of wedges 27 includes two wedges 41, 43 mounted above said primary set of wedges. Each of the secondary wedges is also provided with angularly juxtaposed surfaces 45, 47. The upper wedge 43 is shown as being releasably secured to the underside of the support I-beam 21 by bolts 49 passing through holes bored in the flanges of the beam and screwed into threaded holes formed in the wedge, and nuts 51 tightened onto the free end portion of the bolts into contact with the beam.

As shown, one wedge 33, 41 of each set of wedges 25, 27 is adjustably mounted so as to be capale of moving into and out of contact with the angularly disposed surface of its adjacent fixed wedge 31, 43. Moreover, the wedges are so positioned that the spacing between the wedges allows the upper surface 53 of the primary wedge 33 to contact the lower surface 55 of the secondary wedge 45, thereby enabling the wedges to be adjusted between an unblocked and a fully blocked position.

The upper wedge 33 of the primary set of wedges slides easily over the lower wedge 31 and is longitudinally moved in the direction of the arrow 56 by means of a piston or plunger 57, having a threaded rod 59 connected thereto. The rod is threadedly mounted in a threaded hole 61 bored in the wedge to allow the plunger to be adjusted with respect thereto. As shown, the plunger travels in a cylinder 63 and is reciprocated in the directions of the arrow 56 by means of the application of fluid pressure to either side thereof.

Pressure is applied to the plunger by means of orifices 65, 67 formed in the cylinder and acts to automatically insert or withdraw the wedge 33 to thereby unblock and block the weighing mechanism of the scale. Since the movement of the plunger is adjustable by means of the pressure applied on both sides of the plunger, and the rod 59 is adjustable in the wedge, the travel of the wedge may be adjusted to any desired position so as to partially or totally block the scale operating mechanism.

The lower wedge 41 of the secondary set of wedges 27, is adjustable by means of a micrometric screw 68 threadedly supported in a holder 70, fixed to the support I-beam in a spaced relationship from the set of wedges 27. This micrometric screw allows the wedge 41 to be adjustably moved in a horizontal plane as indicated by arrow 72. If, The base 39 to which the bottom wedge 31 is attached is mounted over any covenient support 69 which can be made from any material such as concrete or metal. The base is firmly attached to the support by means of anchor bolts 71 passing through the base and nuts 73 threaded onto the bolts.

An overload wedge 29 is attached to the I-beam by a bolt 75, adjacent to the upper wedge 43 of the secondary set 27, for reasons more clearly explained hereinafter.

Although the upper set of wedges 27 and overload wedge 29 have been shown as being fixed to a steel I-beam, it is to be understood that, if deemed suitable, these wedges may also be arranged in any other manner whereby they block the operation of the scale weighing mechanism. One example of a different wedge blocking system would be the direct connection of the wedges to the rail 19, without utilizing an I-beam and a platform therebetween. This system is especially useful with electronic scales or electro-mechanical scales in which the rails ride directly over electronic load cells or in which the rail forms part of the electric load cell. In this instance, it is also obvious that if the rails are blocked, partially or totally, the scale mechanism will be correspondingly blocked and given adequate protection from overloads.

Figure 5:
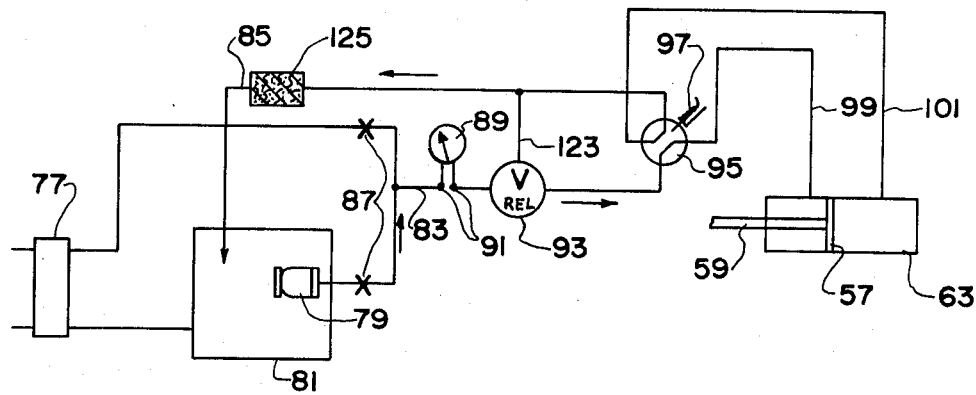
FIG. 5 illustrates the fluid flow circuit for operating the blocking system of the instant invention.

FIG. 5 illustrates in schematic form the preferred embodiment of the fluid flow circuit of the present invention. This fluid system may include a manual pump 77 connected in parallel with an electrically operated pump 79 for removal of liquid from a reservoir 81. The output from either pump is fed into a pressure line 83, and a return line 85 feeds the liquid back into the reservoir. Hand operated shut-off valves 87 are provided for controlling the feed of fluid from either of the pumps to the pressure line 83.

The pressure line 83 includes a combination limit switch and pressure gauge 89 provided with electrical contacts 91 and a pressure release valve 93. A four-way manual and electrical valve 95 having a solenoid operator 97 controls the flow of fluid from the pressure line 83 to either side of the plunger 57 through lines 99, 101. The operation of the electrical pump 79 is normally controlled by the operation of contacts 91 to maintain an adjustable minimum pressure in the line 83.

Figure 6:
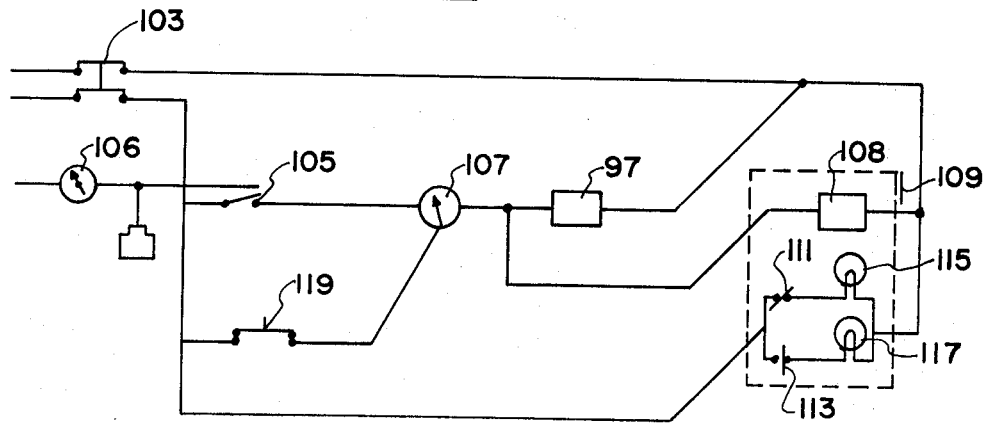
FIG. 6 shows the electrical control circuit for the blocking system of the present invention.

FIG. 6 shows schematically the preferred embodiment of the electrical circuit, including an input switch 103 controlling the flow of electrical power to an operating switch 105. The operating switch 105 is preferably located adjacent to the scale weighing beam or scale dial 106 and is connected in series with a timer 107 further connected in series with the solenoid 97 of the four-way valve. The operating coil 108 of a relay 109 is connected in parallel with the timer and the solenoid of the four-way valve. The relay includes two contacts, one normally closed 111 and one normally open 113. The normally closed contact 111 is connected in series with a first light 115, preferably green in color, and the normally open contact 113 is connected in series with a red light 117. The switch 105 is further connected in parallel with a manual push button 119 for starting the entire circuit.

The operation of the scale blocking means will now be described. In the partially or totally blocked position of the weighing mechanism, the weighing beam or weighing dial 106 is in its locked position, and the operating switch 105 should be in the open position. Since the switch 105 is open, no current passes to the solenoid 97 of the four-way valve or to the relay coil 108.

The current therefore passes through the normally closed contact of the relay 111 and lights the green light. This will indicate that the scale platform 17 is blocked and that locomotives, trains, cars, trucks, and other vehicles may freely travel over the platform, without causing any damage to the weighing mechanism of the scale.

Figure 7:
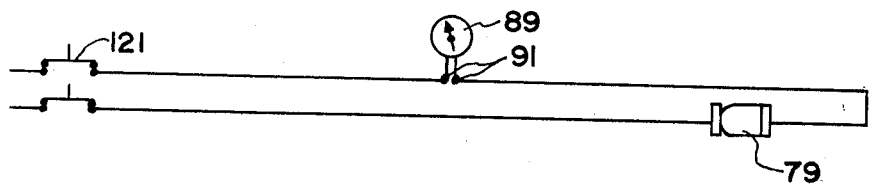
FIG. 7 is an enlarged view showing a portion of the circuit of FIG. 6 having a pressure gauge in series with the hydraulic pump.

To unblock the weighing mechanism, the main switch 103 and a pump switch 121 are closed (FIG. 7). The pump switch 121 will feed current to the electric pump 79 to start the pump and develop pressure in line 83. As indicated above, the pressure gauge includes a limit switch of the maximum-minimum type and also has a manual adjustment for setting the limits thereof. When the pressure in line 83 reaches the adjusted maximum, the contacts 91 open and the pump is stopped. If the pressure somehow falls below the adjusted lower limit, the contacts will be closed and the motor will be started again to bring the system up to pressure.

With the solenoid 97 in the de-energized position, the four-way valve applies fluid to the right-hand side of the cylinder through line 101 to force the wedge 33 into the blocking position, thereby partially or totally blocking the scale weighing mechanism. If it is desired to totally block the weighing mechanism, the wedges are adjusted so that the upper surface 53 of the wedge 33 is brought into contact with the lower surface 55 of the movable wedge 41 at the same time that the surfaces 35, 37, 45, 47 are in contact.

Upon actuation of the main switch 103, the weighing beam or dial 106 is also unlocked. This unlocking automatically closes the switch 105 which, in turn, closes the electric circuit of the timer 107 and energizes the solenoid 97 of the four-way valve 95. The energizing of the solenoid changes the setting of the four-way valve, thus delivering pressure to the left-hand side of the cylinder through line 99 and relieving the pressure in the right-hand side of the cylinder through line 101. This causes the plunger 57 to travel from left to right thereby pulling the wedge 33 in the same direction, away from the wedges 31, 41. This leaves the scale in a fully open position and allows the scale to be used to weigh items up to the full load capability of the scale.

At the same time that the wedge 33 is being moved to the unblocked position, the coil 108 of the relay 109 is energized, thereby opening the normally closed contact 111 and closing the normally open contact 113. The green light is thus turned off and the red light is turned on, indicating that the scale is now in the operative position and that no vehicles exceeding the capacity of the scale should be placed on the scale.

In normal use of the scale, after each vehicle is weighed, the wedges are moved into engagement with the weighing mechanism to block the same to insure protection of the weighing mechanism. To automatically bring about this result in case of inadvertence or negligence on the part of personnel, the timer 107 is connected in series with the switch 105. The timer 107 is manually adjusted to any suitable period of time during which it is desired to keep the weighing mechanism unblocked, i.e., for the approximate period of time it will take to weigh a complete train. For example, the timer may be adjusted to a period of 15 minutes. Thus, once the timer is energized through switch 105, it is self-energized through switch 119 and even if switch 105 is continuously opened and closed, the solenoid valve 97 will remain energized and the wedge 33 will remain in the unblocked or withdrawn position so that weighing can continue uninterrupted. Furthermore, the coil 108 of relay 109 will remain energized and the red light will remain lit. If, after the 15-minute interval, it is desired to continue the weighing, the switch 105 is merely opened and then re-closed. The closing will re-energize the timer once again and a new 15-minute cycle will be repeated.

If it does not take the full 15-minute cycle to weigh the train, the push button 119 may be opened to de-energize the solenoid of the four-way valve and the coil of the relay, and cause the wedge 33 to be driven into the mechanism blocking position. The red light will be switched off and the green light turned on to indicate that the scale is blocked and that traffic may pass over the platform.

If through inadvertence or negligence the push button 119 is not opened after the weighing of a train is finished, at the end of the set time period, i.e., the 15-minute period set forth above, the timer will operate to automatically open the circuit, thereby driving the wedge 33 into the blocking position.

The relief valve 93 provides additional protection to the hydraulic system on possible failure of the limit switch. The relief valve is adjusted to open when the pressure in the line 83 reaches an adjustable maximum pressure. The relief valve merely passes the excess pressure through line 123 to the return line 85 to prevent any damage to the system. A filter 125 is preferably provided in the return line 85 to filter all fluid returning to the reservoir.

The manual pump 77 is for use during emergencies, such as current failure or the like and, by merely opening the valve 87 between the manual pump and the pressure guage 89 and closing the other valve 87, between the electric pump 79 and the pressure guage 89, may be used to manually charge the system.

While the weighing mechanism of the scale may be partially or totally blocked by the wedge system of the instant invention, it is generally not advisable to let the scale become completely unloaded by lifting the platform and/or rail from the weighing mechanism. There is a danger of loosening or losing some of the knife edges, bearings, or other parts of the weighing mechanism. This will cause the scale to lose its unloaded zero balance and will necessitate the continuous rebalancing of the scale.

Since the present invention is provided to protect the scale mechanism from excessive loads beyond its normal capacity, there is no danger in leaving the scale somewhat loaded within its maximum capacity. This is preferably done by only partially blocking the scale. The degree of blocking of the scale is adjustable by virtue of the upper set of wedges 27. It is effected by adjusting the position of the lower wedge 41 with respect to the upper wedge 43 by means of the micrometric screw 68. This displacement will vary, but will normally be very small, somewhere between 1/10 and 1/100 of a millimeter. In the situation where a very heavy load, such as a locomotive, weighing, for example, 300 tons is placed on the platform of the scale, the wedges may be adjusted so as to absorb approximately 80 percent of the load, i.e., some 240 tons. This will leave the balance of 20 percent, or some 60 tons, to be absorbed by the scale weighing mechanism. It, in the example given, the scale is of a 150 ton capacity, there will be absolutely no danger in letting it absorb 60 tons. The adjusting mechanism of the upper wedges 27, therefore, serve the purpose of regulating the amount of blocking desired to enable the scale to always carry a certain load so that the scale will never lose its true balance due to the loosening or misalignment of any of its parts.

The additional or overload wedge 29 added adjacent to the upper set of wedges 27 is for the purpose of fully protecting the scale mechanism against travel of a locomotive or the like over the platform if the weighing mechanism has not been blocked. The position of this wedge is adjustable so that the lower tip 127 thereof is only slightly above the upper surface the wedge 33 when the wedge 33 is in its extreme outward or unblocked position. This distance may vary from a fraction of a millimeter or a few millimeters. When the wedge 33 is resting under the wedge 29, the normal flecture of the I-beams 21 and the rails 19 is used. When a locomotive or other heavy object passes over the platform, there will be a natural, normal flecture of the I-beams and the rails. This flecture will cause the tip 127 of the wedge 29 to come into contact with the upper surface 53 of the wedge 33 and will normally support approximately 80 percent of the load in the form and manner described above.

The lower pointed tip 127 of the wedge 29 and the upper surface 53 of the wedge 33 are designed to support these loads, but only in an emergency and for a short period of time to prevent the destruction of the scale.

As shown in FIG. 2 of the drawings, a number of blocking systems 23 may be required, depending on the capacity of the scale, its resistance, and the length of the platform and rails used. In a railroad track scale as shown, normally containing six sections, the platform is approximately 66 feet long and might require up to ten blocking systems 23 for each I-beam, i.e., a total of 20 sets, to properly block the entire scale. Therefore, the blocking system used must be simple, efficient and require a minimum of moving parts.

The present invention discloses an efficient, simple system, which, after being fixed in position, will allow for continuous operation without further attention or adjustment.

The present invention allows the weighing mechanism of any known scale to be blocked, but is particularly adaptable for use in large railway scales having a capacity above 100 tons. With the present invention, it is obvious that the weighing mechanism of the scale may be quickly and easily blocked to prevent the destruction thereof.

It will be apparent from the foregoing description of the invention in its preferred form that it will fulfil all the objects attributable thereto. While it has been illustrated and described in considerable detail, the invention is not to be limited to the details that have been set forth.

What is claimed is:

1. A system for blocking the weighing mechanism of a scale comprising
a set of primary wedges, including a movable upper wedge having a flat upper surface and an inclined lower surface, and a fixed lower wedge having an inclined upper surface, said movable primary wedge being capable of being moved into and out of contact with the inclined surface of said fixed primary wedge for blocking and unblocking, respectively, the movement of said weighing mechanism, and automatic control means for reblocking said weighing mechanism; and
a secondary set of wedges mounted above said upper surface of said movable primary wedge, said secondary wedges including an adjustable wedge and a fixed wedge, said adjustable secondary wedge having a flat bottom surface adjacent the flat upper surface of said movable primary wedge and an inclined upper surface capable of being adjusted with respect to an adjacent inclined surface formed on said fixed secondary wedge, whereby, upon adjustment of said adjustable secondary wedge, said inclined surface thereof will be moved toward and away from said adjacent inclined surface and the blocking of the movement of said weighing mechanism by the contacting of said upper surface of said movable primary wedge with said bottom surface of said adjustable secondary wedge will be adjustably regulated between totally blocked and partially blocked positions.

2. The scale blocking system of claim 1, including an overload wedge adjustably carried adjacent to said secondary set of wedges above said upper surface of said movable primary wedge, said overload wedge capable of being moved into contact with said upper surface of said movable primary wedge when said movable primary wedge is in its unblocked position and said scale is subject to a load exceeding a predetermined maximum.

3. The scale blocking system of claim 2 wherein said movable primary wedge includes a rod adjustably attached thereto, said rod being connected to a piston held in a cylinder whereby said wedge is moved by the action of said piston when hydraulic fluid is applied to said cylinder.

4. The scale blocking system of claim 3 including an electric control circuit having an inlet switch connected with the weighing dial of said scale whereby upon actuation of said weighing dial, said electric circuit automatically regulates the flow of hydraulic fluid to said cylinder to move said wedge to the unblocked position to thereby render the scale operative.

5. The scale blocking system of claim 4 including an adjustable automatic electric timer for returning the movable primary wedge to the scale weighing mechanism blocking position after an adjustable, predetermined period of time.

6. The scale blocking system of claim 5 including a manually operated electric switch capable of bypassing said electric timer to thereby operate said circuit to cause said hydraulic system to move said primary wedge into the scale blocking position before the end of said adjusted period of time.

7. The scale blocking system of claim 6 including a colored light in said electric circuit to indicate when said scale is in the unblocked position and a further colored light to indicate when said scale is in the blocked position.

8. A system for blocking the weighing mechanism of a scale comprising, in combination
a platform;
I-beams supporting said platform;
a plurality of blocking mechanisms adjustably fixed between said I-beams and said weighing mechanism;
each of said blocking mechanisms including, a primary set of wedges including an upper wedge movable with respect to a fixed lower wedge, said upper wedge including a flat upper surface and an inclined lower surface, said fixed lower wedge having an inclined upper surface facing the inclined surface of said movable wedge, said inclined surface of said movable wedge being capable of being moved into and out of contact with said inclined surface of said fixed wedge whereby it blocks or unblocks, respectively, the movement of the scale weighing mechanism;

a secondary set of wedges adjustably mounted on one of said I-beams above said primary set of wedges, one of said secondary wedges being adjustable and the other of said secondary wedges being fixed to one of said I-beams, said adjustable secondary wedge having a flat bottom surface and an inclined top surface, said adjustable secondary wedge being capable of being adjustably moved so that its inclined surface moves into and out of contact with an inclined surface formed on said fixed secondary wedge while the flat bottom surface thereof moves into and out of contact with the flat upper surface of said movable primary wedge, whereby the blocking movement of said blocking means is regulated between totally blocked and partially blocked positions;

an overload wedge adjustably mounted on one of said I-beams adjacent said set of secondary wedges, said overload wedge including a narrowed top portion, said tip portion resting over the upper surface of said movable primary wedge when said movable primary wedge is in the unblocked position, whereby, if said platform and said I-beams are deflected by a load when said weighting mechanism is in the unblocked position, said overload wedge will be forced into contact with said upper surface of said movable primary wedge to prevent overloading of the scale weighing mechanism; and a combination electric and hydraulic system for automatically controlling the blocking and unblocking operation of said movable primary wedge, said system including an input switch actuated by the opening of the weighting beam to automatically operate said movable primary wedge to the unblocked position, and an adjustable electric timer capable of returning the movable primary wedge to the blocked position after an adjusted period of time.

* * * * *

UNITED STATES PATENT OFFICE
CERTIFICATE OF CORRECTION

Patent No. 3,773,123     Dated November 20, 1973

Inventor(s) Manuel Martinez de Castro Lopez

It is certified that error appears in the above-identified patent and that said Letters Patent are hereby corrected as shown below:

Column 3, line 65 the word "If," should be deleted.

Column 6, line 66 the word "It," change to -- If, --.

Signed and sealed this 4th day of June 1974.

(SEAL)
Attest:

EDWARD M. FLETCHER, JR.
Attesting Officer

C. MARSHALL DANN
Commissioner of Patents